(No Model.)
W. A. LUTTGEN.
BELL.
No. 450,169. Patented Apr. 14, 1891.
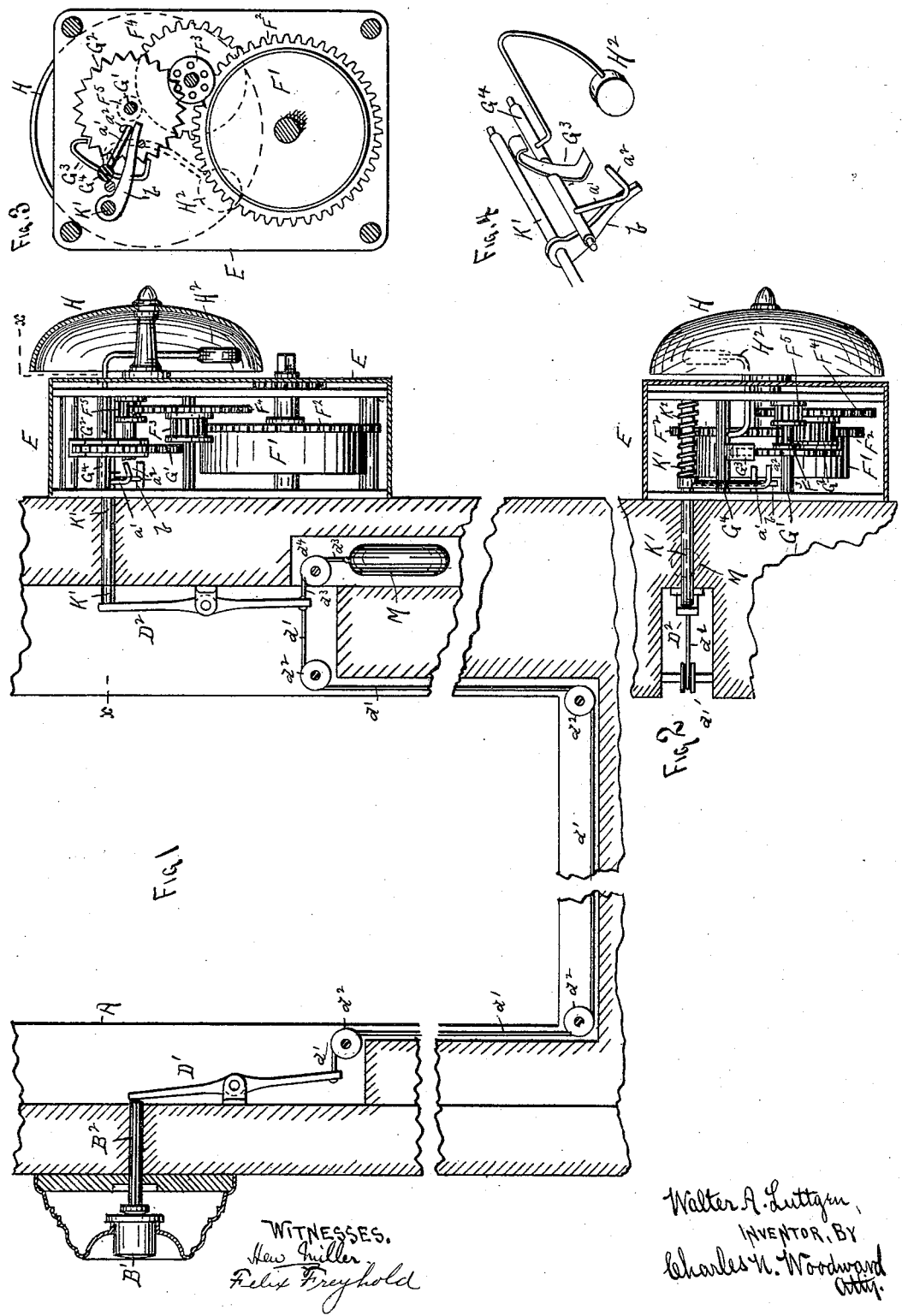
WITNESSES.
Hew Miller
Felix Freyhold
Walter A. Luttgen,
INVENTOR, BY
Charles K. Woodward
Atty.

UNITED STATES PATENT OFFICE.

WALTER A. LUTTGEN, OF MINNEAPOLIS, MINNESOTA.

BELL.

SPECIFICATION forming part of Letters Patent No. 450,169, dated April 14, 1891.

Application filed April 28, 1890. Serial No. 349,803. (No model.)

*To all whom it may concern:*

Be it known that I, WALTER A. LUTTGEN, a citizen of the United States, residing at Minneapolis, in the county of Hennepin and State of Minnesota, have invented certain new and useful Improvements in Mechanical Signal-Bells, of which the following is a specification.

This invention relates to signal or house bells; and it consists in the construction, combination, and arrangement of parts, as hereinafter shown and described, and specifically pointed out in the claim.

In the drawings, Figure 1 is a sectional side elevation of the mechanism arranged in the walls of a building. Fig. 2 is a plan view of a portion of the mechanism, in section, on the line X X of Fig. 1. Fig. 3 is a view of the bell-operating mechanism detached. Fig. 4 represents the escapement-operating mechanism in detail and enlarged.

This apparatus is intended more particularly as a signal-bell for house use, and I have shown it in this location; but it may be employed in other locations, if desired.

A represents a portion of the outer casing or frame of the outside door, in which a push-button B' is inserted, the stem B² of the push-button adapted to actuate a lever D' inside the door-casing, as shown.

The signal mechanism is arranged within a casing or frame E at any convenient point inside the house, one of the advantages claimed for my invention being that the signal mechanism may be located at any distance away from the push-button. Within the casing E is mounted a coiled spring within a drum F', and connected by gears and pinions F² F³ F⁴ F⁵ to a shaft G', carrying an escapement-wheel G², the latter adapted to be held by an escapement G³ on a shaft G⁴. The bell or gong H is mounted on the casing E, and the hammer H² is connected to the escapement-shaft G⁴, as shown. Connected to the shaft G' is an arm or rod $a'$, which is projected inward and downward and turned to one side with a slightly-upward trend at the end, as shown at $a^2$.

K' is a rod passing through the upper part of the casing E and provided with a spring K² to keep its end pressed backward against a pivoted lever D². Projecting from this shaft or rod K' is an arm $b$, whose outer end rests beneath the angular end $a^2$ of the rod $a'$, as shown. The lower ends of the levers D' D² are connected by flexible wire or cord $d'$, running over suitable pulleys $d^2$ beneath the floors or in the partitions of the building in any required direction. Attached to the lower end of the lever D² is another cord or wire $d^3$, leading over a pulley $d^4$ and provided with a weight M, the function of the weight being to keep the cords stretched taut and return the push-button to its outward position and keep it pressed outward. A spring might be substituted for the weight M; but I prefer the latter as being more simple and less liable to get out of order.

The form and location of the rod $a'$ with its angular end $a^2$ are such that when the arm $b$ is beneath the lowermost point, as in Figs. 1, 2, and 3, the escapement G³ will be held rigidly against the escapement-wheel G², and when the rod is pushed inward by the combined action of the push-button B', levers D' D², and cord $d'$, the arm $b$ will pass beneath the upwardly-curved end $a^3$ of the rod $a'$ and release the escapement and permit the spring to cause the wheel G² to oscillate it and thus cause the hammer to rapidly vibrate against the bell, and this will continue as long as the push-button is held in its inward position. Then when the push-button is released the spring K² will force the rod K' outward again and return the arm $b$ to its position beneath the lower end $a^2$ of the rod $a'$ and stop the motion of the escapement, while at the same time the weight M returns the levers D' D² and the push-button to their former position, ready for the next action. By this construction I combine all the advantages of the ordinary electric bell with the simplicity of the mechanical signal-bell and the ability to locate the signal mechanism in any desired location away from the push-button.

Having thus described my invention, what I claim as new is—

In a signal-bell, a spring connected by gearing to an escapement-wheel, a bell, a shaft carrying an escapement adapted to be actuated by said escapement-wheel and with a rod $a'$, having an angular end $a^2$, and provided with a hammer to sound said bell, spring-shaft $K'$, carrying an arm $b$ for supporting said angular end $a^2$, a lever $D^2$, having weight M connected thereto and adapted to operate said shaft $K'$, a lever $D'$, adapted to be actuated by a push-button $B'$, and cords or wires $d'$ connecting said levers, whereby said escapement may be held stationary or permitted to be actuated by said spring-shaft, substantially as and for the purpose set forth.

In testimony whereof I have hereunto set my hand in the presence of two subscribing witnesses.

WALTER A. LUTTGEN.

Witnesses:
C. N. WOODWARD,
J. T. CHRISCHILLES.